Figure 1:
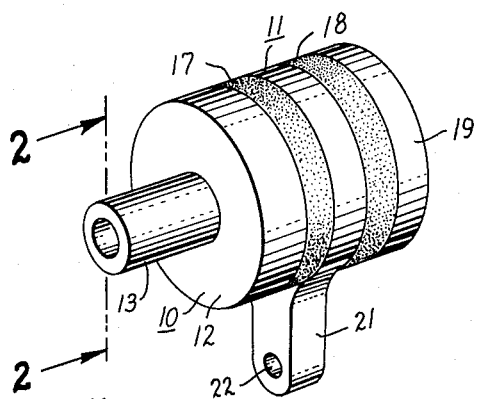

Nov. 16, 1965     R. T. CASEY     3,218,412

HIGH PRESSURE CURRENT LIMITING DEVICE

Filed June 27, 1963

INVENTOR.

Robert T. Casey

3,218,412
HIGH PRESSURE CURRENT LIMITING DEVICE
Robert T. Casey, Southington, Conn., assignor to General Electric Company, a corporation of New York
Filed June 27, 1963, Ser. No. 291,097
8 Claims. (Cl. 200—113)

My invention relates to current limiting devices, and more particularly to current limiting devices which operate to limit current by transforming a solid metallic conducting medium into a gaseous conducting medium under extremely high pressure, providing correspondingly high resistance.

In accordance with the prior art, it is known that current limiting function may be achieved by transforming a metallic conducting medium to a gaseous conducting medium under high pressures, and particularly by restraining the conductive medium so that when it is in the gaseous state it occupies substantially the same volume as it occupied when in the solid state. This results in tremendously high pressures and causes the gaseous conducting medium to exhibit a high resistance characteristic with a positive resistance-current characteristic such than an increase in current causes an increase in resistance. A current limiting action is thereby achieved which has the effect of stopping a rising short-circuit current at an early point in its prospective current wave and causing it to return immediately to zero before it has reached destructively high magnitudes. The action of the device in this respect is comparable to that of "current limiting" fuses which are widely used for protection against extremely high short-circuit currents. A current limiting device of the high pressure gaseous metal type is disclosed, for example, in application Serial No. 29,629, Ralph L. Hurtle, filed May 17, 1960, now Patent No. 3,117,203, issued January 7, 1964, and assigned to the same assignee as the present invention.

In accordance with prior art devices of the type disclosed in the aforesaid application, a disc or wafer of highly refractory insulating material, such as a ceramic material, is sandwiched between two metallic electrodes, and is provided with one or more fine holes therethrough interconnecting the metallic electrodes. The fine holes are filled with mercury, and the assembly is rigidly retained together in such a way that substantially no expansion of the mercury can occur upon heating of the mercury to the point where it is transformed to a gaseous state.

In devices of this type, since the mercury is contained within one or more holes in a ceramic material, the tensile strength of the ceramic material becomes a limiting factor as to the magnitude of the pressures which can be tolerated in the device, and therefore the level of its possible current limiting action. In order to insure sufficiently high degree of pressure tolerance, for example, means are disclosed in the aforesaid application for exerting an initial inward or counter pressure on the ceramic so that it is placed in a "pre-stressed" condition, thereby enabling a positive pressure of substantial magnitude to be developed within the hole in the ceramic material without unduly stressing the ceramic material. The provision of such pre-stressing means, however, is relatively expensive and results in a relatively bulky and heavy assembly.

It is an object of my invention to provide a high pressure current limiting device which is capable of retaining a conductive medium in high pressure condition without requiring the use of insulating material operating under high tensile stress.

It is a further object of the invention to provide a high pressure current limiting device of the type described in which substantially all tensile stresses are absorbed by metallic components.

It is a further object of the invention to provide a high pressure current limiting device which is capable of easy assembly and manufacture.

In accordance with the invention in one form, I provide a current limiting device comprising a pair of metallic electrodes, and insulating means between the electrodes, comprising one or more insulating members. The electrodes and the insulating means are assembled in such a way as to provide a closed chamber which is filled with mercury, and the parts are so disposed that the only surface of any one insulating spacer member exposed to the mercury chamber is a single flat planar surface.

In accordance with the invention in a particular form, a first electrode comprises a metallic member having an opening therein and the other electrode comprises a cylindrical member passing through the hole in the first member and leaving an annular space therebetween, the annular space being filled with mercury and the opposite sides of the space being closed by a pair of refractory insulating members. The assembly is cemented together, with the result that when the mercury is vaporized, the central electrode is placed in compression, the outer ring electrode is placed in tension, and the insulating spacer members are placed in compression.

In accordance with the invention in another form, a pair of electrodes are provided with confronting spaced apart cylindrical ends, the space between the confronting cylindrical ends being partly occupied by a highly refractory insulating spacer member of slightly lesser diameter than the electrode ends. A metallic ring surrounds the insulating spacer, and has an inner diameter greater than the diameter of the spacer, leaving an annular space therebetween. This space is closed axially by a pair of toroid-shaped refractory insulating rings to form a closed chamber which is filled with mercury.

The invention will be more fully understood from the following detailed description, and its scope will be pointed out in the appended claims.

Figure 2:
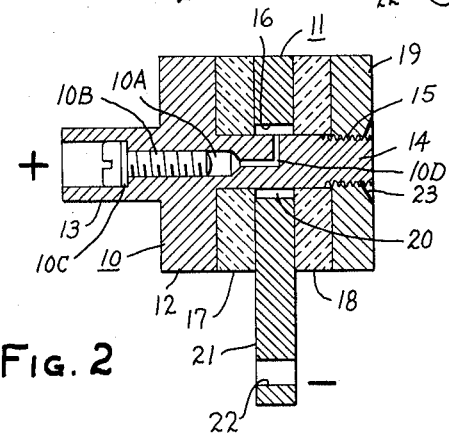
Figure 3:
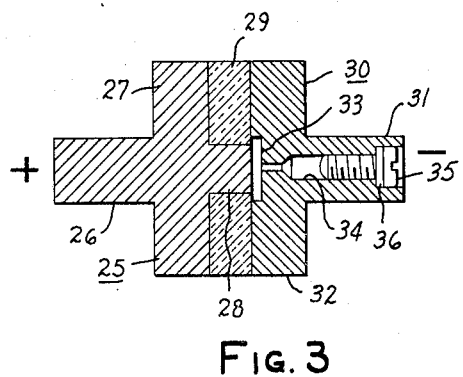
Figure 4:
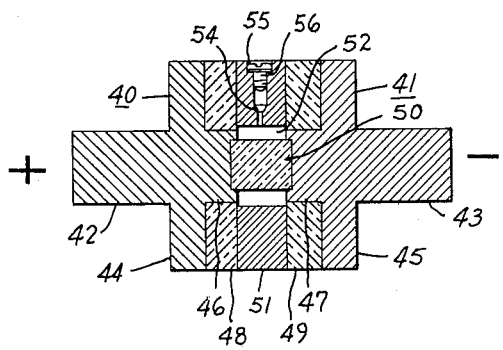

In the drawing,
FIGURE 1 is a perspective view of a current limiting device embodying the invention;
FIGURE 2 is a sectional view taken substantially on the plane indicated by the line 2—2 of FIGURE 1;
FIGURE 3 is a sectional view of another embodiment of the invention, and
FIGURE 4 is a sectional view of a third embodiment of the invention.

Referring to the drawing, the invention is shown as incorporated in a current limiting device comprising a pair of electrode members 10 and 11. The electrode 10 includes a main disc shaped portion 12, a terminal stem 13 and a cylindrical extension 14, having its outer end threaded as at 15. The electrode 11 has a centrally located circular hole 16, so dimensioned as to leave a space between it and the extension 14 of the electrode 10. The electrode 11 is spaced axially from the portion 12 of the electrode 10 by a toroid or washer 17 of highly refractory insulating material, such as ceramic insulating material. The electrode 11 has an integral extension 21 provided with a hole 22 to facilitate connection of the electrode in an electric circuit.

A second refractory insulating washer or toroid 18 is carried by the outer portion of the extension 14 and overlies the outer side of the electrode 11. The assembly is retained in assembled relation by a retaining ring or nut 19 of metallic material which threadedly engages the portion 15 of the extension 14 and serves to clamp the insulating members 17 and 18 and the electrode 11 together and against the main portion 12 of the electrode 10.

In addition to the clamping action provided by the threaded retaining member 19, all interfaces are brazed together to provide a strong mechanical union and hermetic seal. Thus the member 17 has its flat faces brazed to the flat surfaces of the portion 12 of the electrode 10 and also to the flat face of the electrode 11, respectively. The insulating member 18 likewise is brazed at opposite sides to the electrode 11 and to the retaining member 19 respectively. It will be observed that this provides a "balanced stress" arrangement, in that each ceramic member is brazed at each of its opposite sides in a symmetrical manner to an adjoining metallic member.

The space 20 between the central extension 14 of the electrode 10 and the inner wall of the hole 16 of the electrode 11, is filled with a low-melting-point conducting medium, preferably mercury. The mercury is introduced into the chamber 20 by means of a filling hole 10A in the electrode 10, which is sealed by means of a screw 10B extending in threaded engagement in the hole 10A and including a resilient gasket 10C under the head thereof. A second hole 10D extends radially into the extension 14 of the member 10 at the point thereof which corresponds to the central portion of the chamber 20.

The retaining member 19 has its threaded hole bevelled as at 23 to provide an annular recess adjacent the end of the extension 14. Following tightening of the assembly, the two parts 19 and the extension 14 are brazed together by filling the recess 23 with brazing material, thereby preventing loosening of the retainer 19.

In operation, the device is connected in series relation to a circuit to be protected by means of the terminals 13 and 21 respectively. The current passes through the electrode 10, radially outward through the mercury contained in the space 20 to the electrode 11 and out through the terminal 21. Upon the occurrence of excess current in the circuit, the mercury in the space 20 is heated to the boiling point and is then transformed to a gaseous state, while being restrained in substantially its initial volume. It will be understood in this connection that the volume of mercury used with relation to the capacity of the circuit is such that minor overload conditions do not sufficiently heat the mercury to cause boiling, but high overload conditions do cause such heating. Since such overload conditions occur with extreme suddenness, the current tends to rise very rapidly, and thus the entire assembly does not have time to heat, and therefore changes in temperature of the various parts, and corresponding changes in their dimensions because of thermal expansion, can be substantially disregarded.

Being restrained substantially to its initial volume, the mercury in the space 20 in its gaseous state becomes a conductor of extremely high resistance, thereby forcing the current to a low level. This depression of the current prevents it from rising to destructively high levels and permits disconnection of the circuit by other associated apparatus, such as conventional fuses or circuit breakers.

In the form of the invention shown in FIGURE 3, a current limiting device is provided including a first electrode member 25 having a stem or terminal portion 26, a circular flange portion 27 and a central extension 28. An insulating spacer or washer 29 is provided of highly refractory insulating material such as ceramic, surrounding the extension 28.

A second electrode member 30 is also provided including a stem portion 31, and a circular flange portion 32. The flange portion 32 includes a circular shallow recess 33 in the inner face thereof concentric with and in alignment with the extension 28 of the member 25, but larger in diameter than the extension 25. The recess 33 is filled with a low-melting-point metal, such as mercury. For the purpose of filling the chamber 33, an axial hole 34 is provided in the terminal portion 30, threaded to receive a sealing screw 35 having a resilient gasket or washer 36 under the head thereof.

The operation of this form of the invention is similar to that described in connection with the form of FIGURE 2. In this case, the current flow is axially through the assembly, from the extension 28 of the terminal member 25, through the mercury in the chamber 33, to the member 30. The members 25, 29, and 30, are brazed together at their interfaces to provide a completely hermetically sealed assembly. There is, therefore, no space for the mercury in the chamber 33 to expand to when heated, and when transformed into its gaseous state, it is therefore restrained in substantially the same initial volume that it occupied as a liquid. This causes it to assume an extremely high resistance condition to the flow of electric current, thereby limiting the current to a relatively low value.

In the form of the invention shown in FIGURE 4, a pair of electrode members 40 and 41 are provided, each having a terminal stem 42, 43 respectively and a flange portion 44, 45 respectively, and a central extension 46, 47 respectively. A pair of insulating washers 48, 49 of highly refractory insulating material are provided surrounding the extensions 46, 47 respectively. The extensions 46, 47 are spaced apart by a generally disc-shaped insulating spacer member 50 which is of slightly smaller diameter than the extensions 46, 47. A central spacer member 51 of metallic material surrounds the insulating spacer 50 and has a central hole therein of such diameter as to leave a small annular space 52 between the spacer 51 and the spacer 50. The members 40, 48, 51, 49, and 41 are all brazed together at their meeting interfaces to provide a hermetic seal, and the space 52 is filled with a low-melting-point metal such, for example, as mercury. Mercury is introduced into the space 52 through the filling hole 54 in the spacer member 51, sealing being accomplished by the sealing screw 55, combined with a resilient gasket or washer 56.

The current path through the assembly is in through the terminal member 40, to the extension 46, through the mercury in the space 52, to the extension 47 of the terminal member 41. Upon the occurrence of high current conditions, the mercury in the space 52 is transformed to a vapor of gaseous state, while still confined to substantially its initial volume.

It will be observed that in all forms of the invention, the ceramic insulating material which is necessary to the assembly, does not have any tensile stress exerted thereon by the mercury when it is in its gaseous condition. Thus in the form of the invention shown in FIGURES 1 and 2, the transformation of the mercury in the chamber 20 from liquid to gaseous state exerts pressures in all directions on the members forming the defining walls of the space 20. The member 11 undergoes tensile stresses at this time. The ceramic insulating member 17 and 18, however, each undergo compressive stresses as the gaseous mercury pushes on the surfaces of these members which form walls of the space 20.

In the form of the invention shown in FIGURE 3, the electrode member 30 undergoes tensile stress when the mercury in the chamber 33 is vaporized, but the ceramic spacer member 29 experiences only compresses stress due to these pressures. Likewise, in the form of the invention shown in FIGURE 4, the metallic member 51 undergoes tensile stress when the mercury in the chamber 52 is transformed to a gaseous state. The insulating spaced members 48, 49, however do not experience this tensile stress.

In current limiting devices of the type where fusible metal is confined within an opening in an insulating spacer member, high tensile stresses are exerted on the insulating material. This has been demonstrated by the fact that in actual testing, failures which do occur are in the form of radial cracks extending outwardly from the hole containing the fusing metal.

While the invention has been shown in only three particular embodiments, it will be readily apparent that many modifications thereof may be made, and I therefore intend by the appended claims to cover all such modifications as fall within the true spirit and scope of the invention.

What I claim as new and desire to secure by Letters Patent of the United States is:

1. A high pressure current limiting device comprising:
   (a) a first electrode of metallic material;
   (b) a second electrode of metallic material;
   (c) insulating means maintaining said first and second electrodes in spaced relation;
   (d) said first and second electrodes and said insulating means having portions thereof combining to define an enclosed chamber;
   (e) a fuse metal contained in said chamber and electrically interconnecting said electrodes;
   (f) said portion of said insulating means defining said enclosed chamber comprising only flat planar portions extending parallel to a reference plane, whereby said insulating means is not subjected to tensile stresses by reason of gas pressures in said chamber.

2. A high pressure current limiting device comprising:
   (a) a first electrode comprising a flanged base portion and a generally cylindrical extension;
   (b) a second electrode having a hole therein through which said extension of said first electrode extends, said hole being dimensioned to leave an annular space between said first and second electrodes;
   (c) a first insulating spacer carried by said first electrode adjacent said flanged portion and between said first electrode and said second electrode;
   (d) a second insulating spacer carried by said first electrode at the side of said second electrode opposite from said first insulating spacer and coaxial with said first insulating spacer, said first and second insulating spacers serving to position said second electrode concentrically of said extension of said first electrode and to close the axial openings of said annual space between said second electrode and said first electrode;
   (e) retaining means retaining all of said first and second electrodes and said first and second insulating spacers in the aforesaid assembled relation;
   (f) and a low-melting-point metal contained in said annular space between said first and second electrodes.

3. A high pressure current limiting device as set forth in claim 2 wherein said retaining means comprises a metallic retaining nut threadedly engaged on the end of said extension of said first electrode, said nut when tightened compressing said insulating washers against said second electrode and all of said members against said flange portion of said first electrode.

4. A high pressure current limiting device comprising:
   (a) a first electrode member having a circular base portion and a central cylindrical extension therefrom;
   (b) an insulating spacer member of highly refractory insulating material carried by said first electrode and having a central hole therein closely receiving said extension of said first electrode;
   (c) a second electrode having a circular base portion;
   (d) a shallow circular recess in said base portion of said second electrode;
   (e) means retaining said second electrode in assembled relation against said spacer member with said central recess in co-axial alignment with said extension of said first electrode, said recess having a diameter greater than the diameter of said extension;
   (f) a low-melting-point metal contained with said recess whereby current passes through said first electrode to said second electrode by way of said low-melting-point metal, and
   (g) whereby said insulating material is not subjected to tensile stresses by gas pressure developed within said recess.

5. A high pressure current limiting device as set forth in claim 4 wherein said low-melting-point metal in said recess comprises mercury.

6. A high pressure current limiting device comprising:
   (a) a first metallic electrode having a circular base portion and a central cylindrical extension;
   (b) a second electrode having a circular base portion and a cylindrical extension, said extension extending toward said extension of said first electrode;
   (c) insulating spacer means between said confronting ends of said extensions of said electrodes;
   (d) a first insulating spacer washer carried by said first electrode extension;
   (e) a second insulating spacer washer carried by said extension of said second electrode;
   (f) a metallic spacer member between said insulating spacer washers, said metallic spacer member having a hole therein of slightly larger diameter than the diameter of said extensions of said first and second electrodes, whereby to define an annular space between said central spacer member and said insulating spacer member;
   (g) means retaining all of the aforesaid parts in assembled relation so as to define a closed annular chamber the inner wall of which is defined by said central insulating spacer member and the outer wall of which is defined by said metallic spacer member, and the end walls of which are defined by said first electrode and said first insulating spacer member in combination and by said second insulating spacer member and said second electrode in combination;
   (h) whereby gas pressures generated in said annular chamber act to subject said metallic spacer member to tensile stresses, but do not subject either said first or second insulating spacer means to tensile stresses, and
   (i) a low-melting-point metal contained in said annular chamber and electrically interconnecting said first and second electrodes.

7. A high pressure current limiting devices as set forth in claim 6, wherein said low-melting-point metal comprises mercury.

8. A high pressure current limiting device as set forth in claim 6, wherein said low-melting-point metal comprises mercury and wherein all of the component parts thereof are retained in assembled relation by brazing.

References Cited by the Examiner

UNITED STATES PATENTS

| | | | |
|---|---|---|---|
| 1,999,124 | 4/1935 | Davy | 200—113 |
| 2,107,742 | 2/1938 | Ruben | 200—113 |
| 2,306,728 | 12/1942 | Heddaeus | 200—113 |
| 2,744,981 | 5/1956 | Spears | 200—113 |
| 3,117,203 | 1/1964 | Hurtle | 200—113 |

BERNARD A. GILHEANY, *Primary Examiner.*